(12) United States Patent  
Kimura (10) Patent No.: US 7,640,833 B2
(45) Date of Patent: Jan. 5, 2010

(54) METHOD OF MANUFACTURING MOLDING BODY HAVING GROOVES THEREON

(75) Inventor: Shintaro Kimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 524 days.

(21) Appl. No.: 11/403,876

(22) Filed: Apr. 14, 2006

(65) Prior Publication Data

US 2006/0230889 A1  Oct. 19, 2006

(30) Foreign Application Priority Data

Apr. 18, 2005 (JP) .............................. 2005-119935

(51) Int. Cl.
*B23B 3/00* (2006.01)
*B23B 1/00* (2006.01)

(52) U.S. Cl. ...................................................... 82/1.11

(58) Field of Classification Search ................... 82/1.11, 82/114; 470/57, 87, 107; 408/23; 29/27 R
See application file for complete search history.

(56) References Cited

U.S. PATENT DOCUMENTS

| 3,171,308 A | * | 3/1965 | Marti | ........................... 82/117 |
| 7,089,836 B2 | * | 8/2006 | Kato et al. | ..................... 82/1.11 |
| 7,350,441 B2 | * | 4/2008 | Campbell et al. | ............. 82/123 |
| 7,430,791 B2 | * | 10/2008 | Yonemaru | .................... 29/27 C |

FOREIGN PATENT DOCUMENTS

JP 2001-315001 A 11/2001

\* cited by examiner

*Primary Examiner*—Will Fridie, Jr.
(74) *Attorney, Agent, or Firm*—Sughrue Mion, PLLC (57) ABSTRACT

There is provided a method of manufacturing a molding body having at least one groove thereon. The method is performed by rotating a workpiece, allowing a tip to contact with an outer peripheral or an inner peripheral face, so as to form the groove in accordance with a shape of an outer edge of the tip, and shifting a position of the tip along a direction orthogonal relative to a rake face of the tip without changing a direction of the rake face thereof, so as to form another groove having a different angle from that of the shape of the outer edge of the tip.

15 Claims, 8 Drawing Sheets

METHOD OF MANUFACTURING MOLDING BODY HAVING GROOVES THEREON

CROSS-REFERENCE TO RELATED APPLICATION

This application claims the benefit of Japanese Patent Application No. 2005-119935 filed on Apr. 18, 2005, the disclosure of which is incorporated herein by reference.

BACKGROUND OF THE INVENTION

1. Field of the Invention

The present invention relates to a method for manufacturing a molding body having a groove or grooves thereon, on which at least one groove is formed by turning.

2. Description of the Related Art

Generally, there are molding bodies having a predetermined groove or grooves thereon, such as an inserted plate having grooves thereon that is installed inside a mold in order to form a cylindrical lens having grooves formed on a convex surface or a concave surface thereof along its circumferential direction, or to form a prism sheet for use in a backlight device of a liquid crystal display. As a method of manufacturing a molding body having grooves thereon, such as the above-mentioned inserted plate, there has been known a method to rotate a sheet-like workpiece which is wound around a jig in substantially solid cylindrical shape, and a plurality of substantially V-shaped grooves (defined by a shape of an outer edge of a tip) that extend along a circumferential direction of the workpiece are formed substantially in parallel each other by bringing the tip into contact with an outer peripheral face of the workpiece, as disclosed in JP-A-2001-315001.

In such a method of manufacturing a molding body having grooves thereon, v-shaped slope faces of the respective grooves are normally formed to be the same in angle. However, recently, it has been requested that these slope faces of the grooves be formed with different angles respectively, as desired. In order to satisfy the above-mentioned request, there have been considered two methods as follows.

Figure 7A:
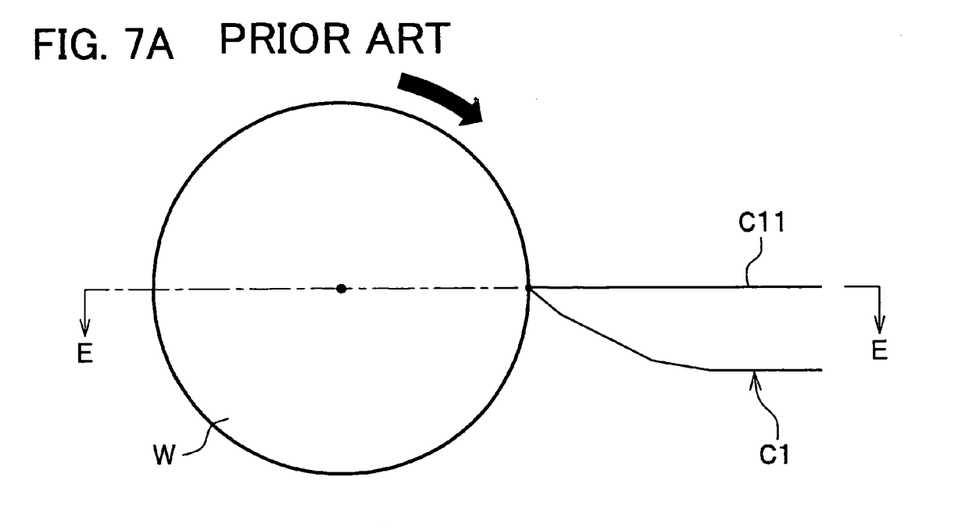
FIG. 7A is a front view of a state in which a workpiece is viewed from an end face.
Figure 7B:
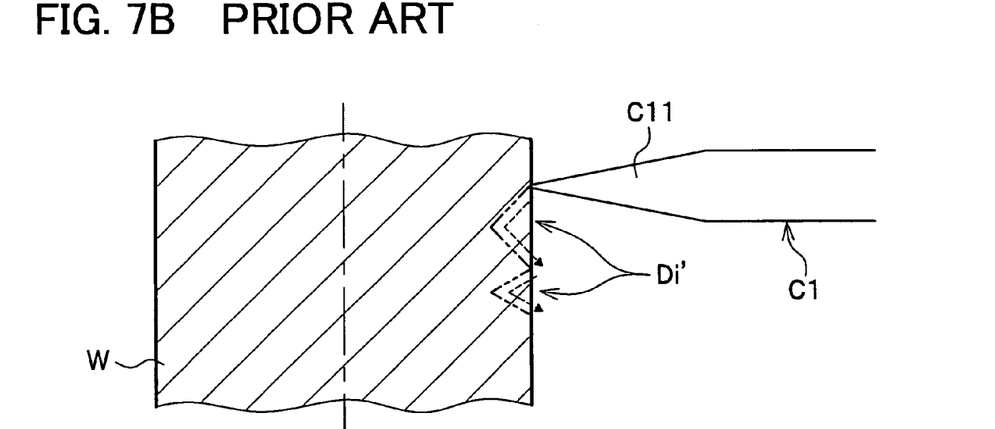
FIG. 7B is a sectional view of a state before processing by a tip.
Figure 7C:
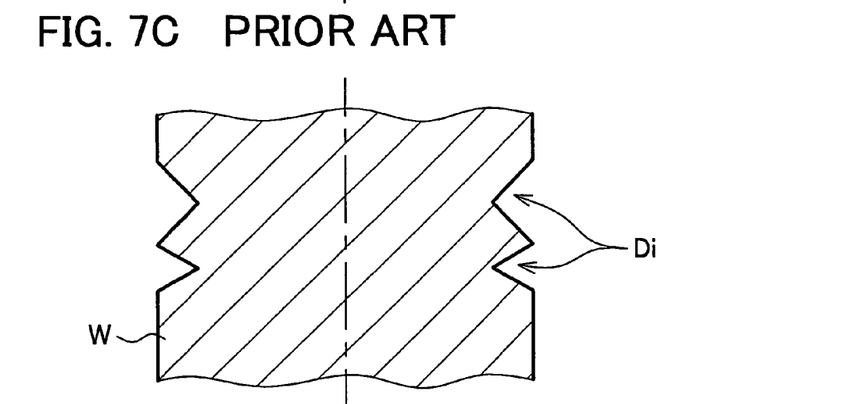
FIG. 7C is a sectional view of a state after processing.

In one method, a tip C1, having a narrow width and having a rake face C11 with a sharply pointed end, is used as shown in FIGS. 7A and 7B. In this method, by tracing slope faces of virtual grooves Di' at a front end of the tip C1, the angles of the slope faces of the respective grooves Di can be formed into different angles as desired, as shown in FIG. 7C.

Figure 8A:
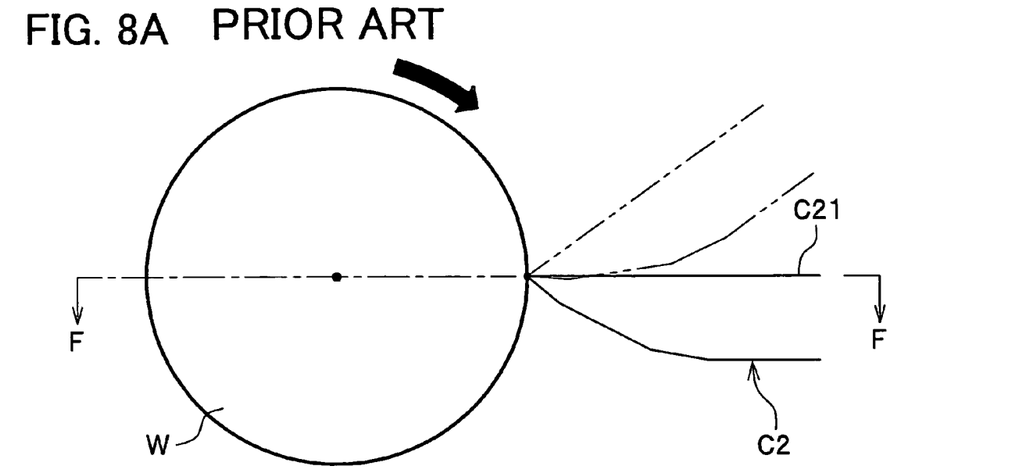
FIG. 8A is a front view of a state in which a workpiece is viewed from an end face.
Figure 8B:
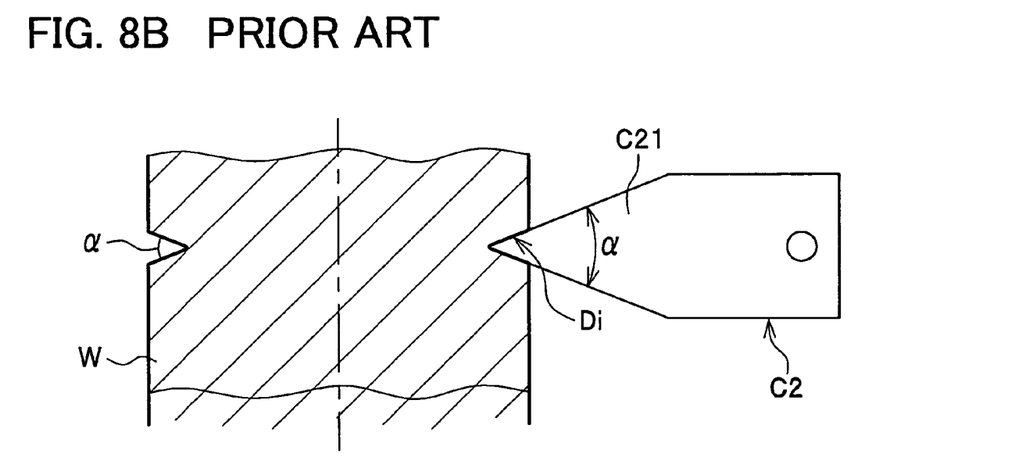
FIG. 8B is a sectional view showing a state in which a groove of a predetermined angle $\alpha$ is formed.
Figure 8C:
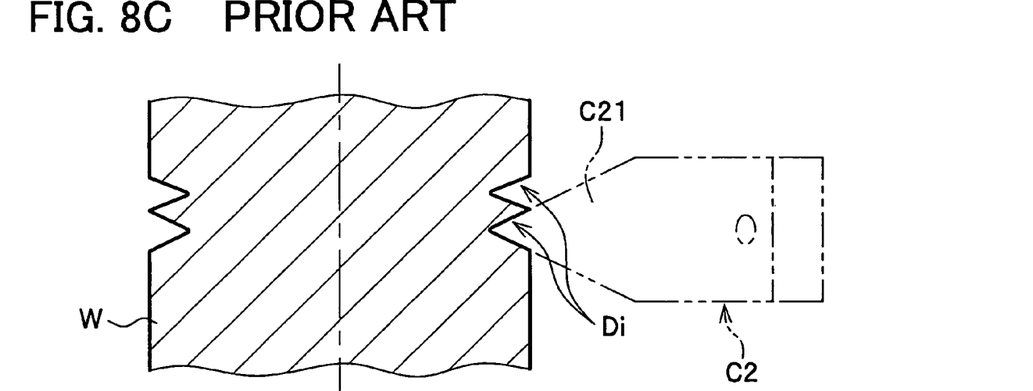
FIG. 8C is a sectional view showing a state in which a groove of an angle greater than the predetermined angle $\alpha$ is formed.

In a second method, as shown in FIG. 8A, a tip C2 of which the rake face C21 has a somewhat larger front end angle α (see FIG. 8B), is inclined with the front end thereof fixed as an anchor point so that a base end portion of the rake face C21 approaches a workpiece W. Accordingly, the angle of the slope faces of the groove Di can be changed as desired. In this method, because by inclining the tip C2, the cross-sectional shape of the groove Di at a predetermined position (for example, the front end position of the tip C2) is formed as if the front end shape of the tip C2 at the predetermined position is projected into the workpiece W, as shown in FIGS. 8B and 8C, so that the angle of the slope face of the groove Di can be changed as desired.

However, the first method has a disadvantage that the slope faces of the groove Di are formed by the sharply pointed front end of the tip C1, which brings difficulties in obtaining a good surface roughness. In the second method, a good surface roughness can be obtained since the groove Di is cut by using side edges of the tip C2. However, in order to incline the tip C2 with the front end thereof fixed as the center, the front end of the tip C2 must agree accurately with the rotation center of a jig that rotatably supports the tip C2, and this center-positioning work is extremely tedious. Particularly, in forming a diffractive element, the rotation center of the jig and the front end of the tip C2 have to agree with each other within an error range of 100 nm or less, which is substantially impossible.

Thus, it has been needed to provide a method of manufacturing a molding body having a groove or grooves thereon, which enables slope faces of grooves to be formed with good surface roughness and enables angles of slope faces of grooves to be changed easily.

SUMMARY OF THE INVENTION

In one aspect of the present invention, there is provided a method of manufacturing a molding body having at least one groove thereon. The method is performed by rotating a workpiece, allowing a tip to contact with an outer peripheral or an inner peripheral face, so as to form the groove in accordance with a shape of an outer edge of the tip, and shifting a position of the tip along an orthogonal direction relative to a rake face of the tip without changing a direction of the rake face thereof, so as to form another groove having a different angle from that of the shape of the outer edge of the tip.

In another aspect of the present invention, there is provided a method of manufacturing a molding body having at least one groove thereon, and the method is performed by the steps of A: rotating a workpiece having a curved face with a predetermined curvature;

B: forming a first groove; and

C: changing a relative position between the tip and the workpiece. In the step of A, the workpiece is rotated about a rotation axis which agrees with a center of the curvature of the curved face thereof.

In the step B, the first groove is formed in such a manner that, while an angle of the rake face of the tip relative to a plane including the rotation axis is fixed in a direction orthogonal to the plane, the workpiece and the tip are converged and the tip is engaged with the curved face of the rotating workpiece so as to form on the curved face the first groove defined by the outer edge shape of the tip, and a direction and depth of the engagement of the tip with the curved face of the workpiece.

In the step C, the relative position between the tip and the workpiece is changed by translating the position of the tip in the direction orthogonal to the rotation axis and parallel to the plane.

The above-mentioned method is performed further by the steps of

A: stopping rotation of the workpiece and replacing the workpiece with a second workpiece having a curved face with a predetermined curvature, and B: rotating the second workpiece about a rotation axis which agrees with a center of the curvature of the curved face thereof; and C: forming a first groove.

In the step B, a third groove is formed, following shifting the relative position between the tip and the workpiece, in such the manner that, while the angle of the rake face of the tip relative to the plane including the rotation axis is fixed in the orthogonal direction to the plane, the second workpiece and the tip are allowed to approach each other, and then the tip is engaged with the second curved face of the second rotating workpiece so as to form on the second curved face of a third groove defined by the outer edge shape of the tip, and a direction and depth of the engagement of the tip with the second curved face of the workpiece.

Other aspect, features and advantages of the present invention will become apparent upon reading the following specification and claims when taken in conjunction with the accompanying drawings.

BRIEF DESCRIPTION OF THE DRAWINGS

FIGS. 3A-3C show diagrams illustrating a method for manufacturing a molding body having grooves thereon.

FIGS. 4A and 4B show a relationship of actual size between the workpiece and the tip.

FIGS. 6A-6C show diagrams of another embodiment of the present invention.

FIGS. 7A-7C show diagrams illustrating a first method among conventional manufacturing methods.

FIGS. 8A-8C show diagrams illustrating a second method among conventional manufacturing methods.

DESCRIPTION OF THE PREFERRED EMBODIMENTS

Embodiments of the present invention will be described in detail hereinafter, with reference to drawings.

Figure 1:
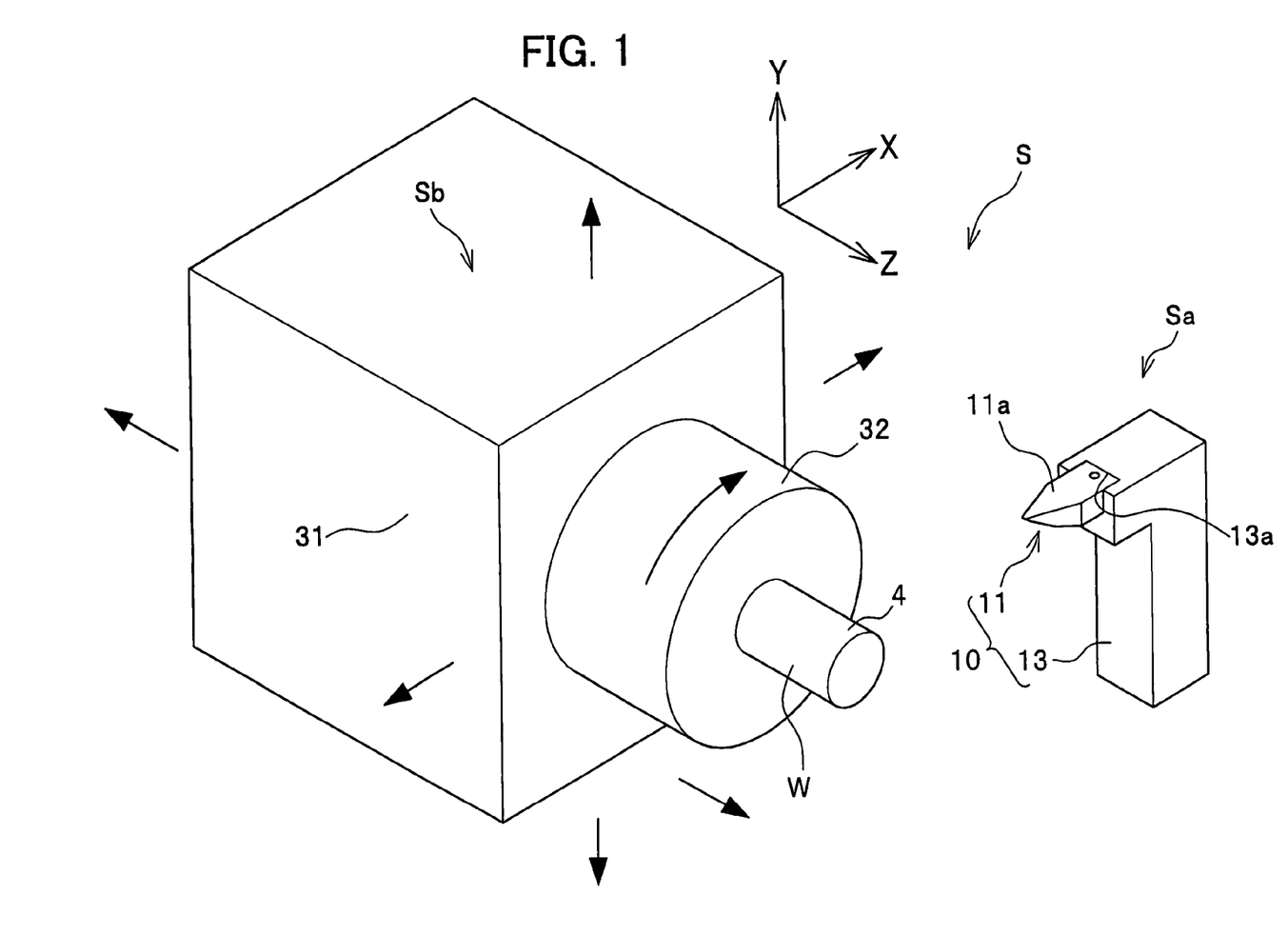
FIG. 1 is a perspective view of a turning device for use in an embodiment of the present invention.
Figure 4A:
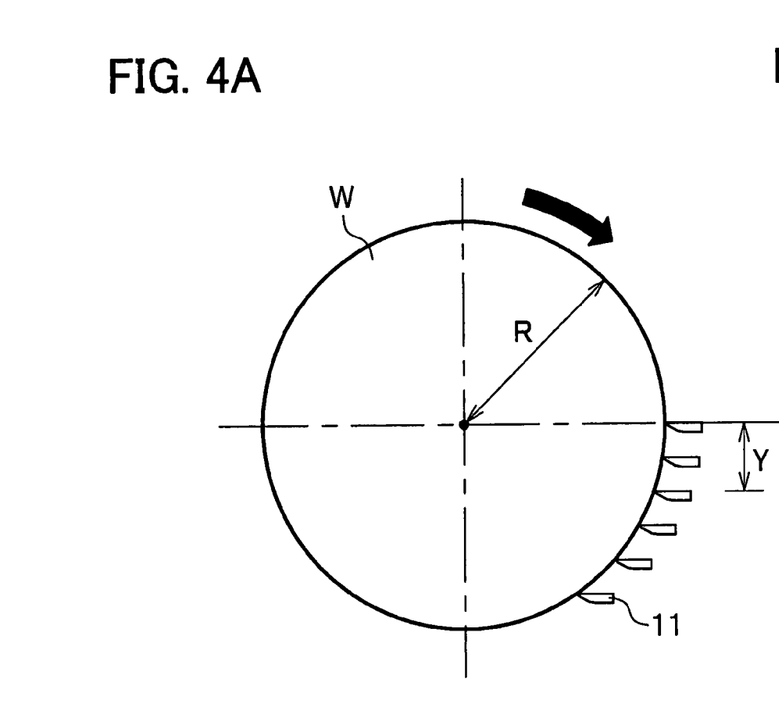
FIG. 4A is a front view of a state in which the workpiece is viewed from an end face.
Figure 4B:
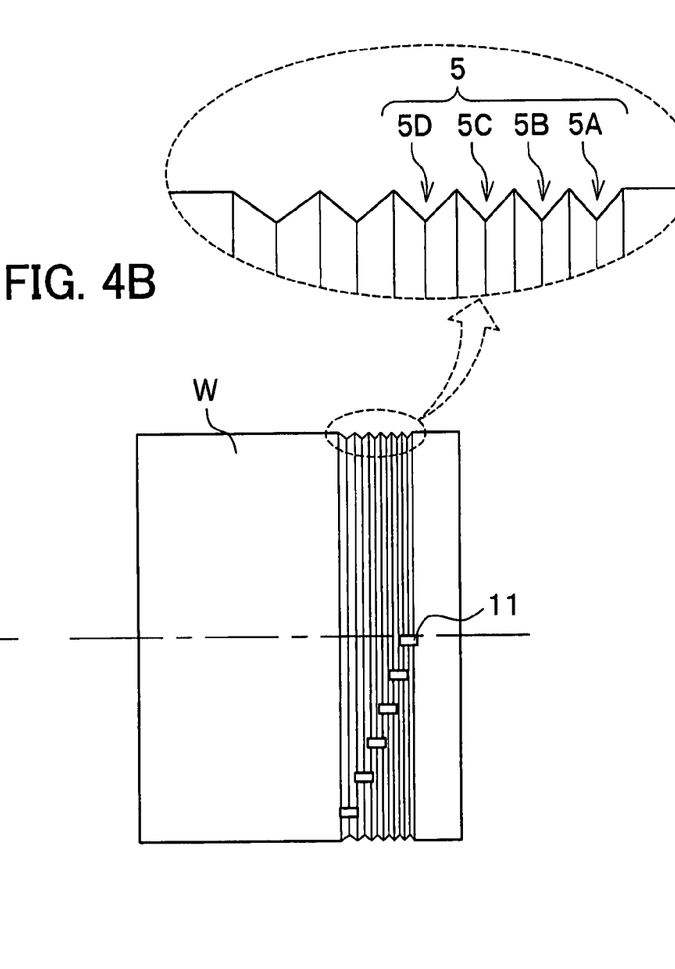
FIG. 4B is a side view of a state viewed from a side face.

As shown in FIG. 1, a turning device S has, as main components, a tool portion Sa including a turning tool 10, and a head portion Sb onto which a solid cylindrical workpiece W is mounted. Details of the respective portions will be described below. Note that, for the sake of convenience, the workpiece W and a tip 11 are depicted in FIG. 1 in an proportion in size that differs from that of the actual dimensions. The actual size relationship of the workpiece W and the tip 11 is as shown in FIG. 4.

[Tool Portion]

The tool portion Sa is mainly constituted of the turning tool 10 having the tip 11, and this turning tool 10 is detachably fixed to a base (not shown in the drawing).

The turning tool 10 is mainly constituted of the tip 11 and a shank 13 (also referred to as a tip holder or main turning tool body), onto which the tip 11 is detachably mounted.

Figure 2:
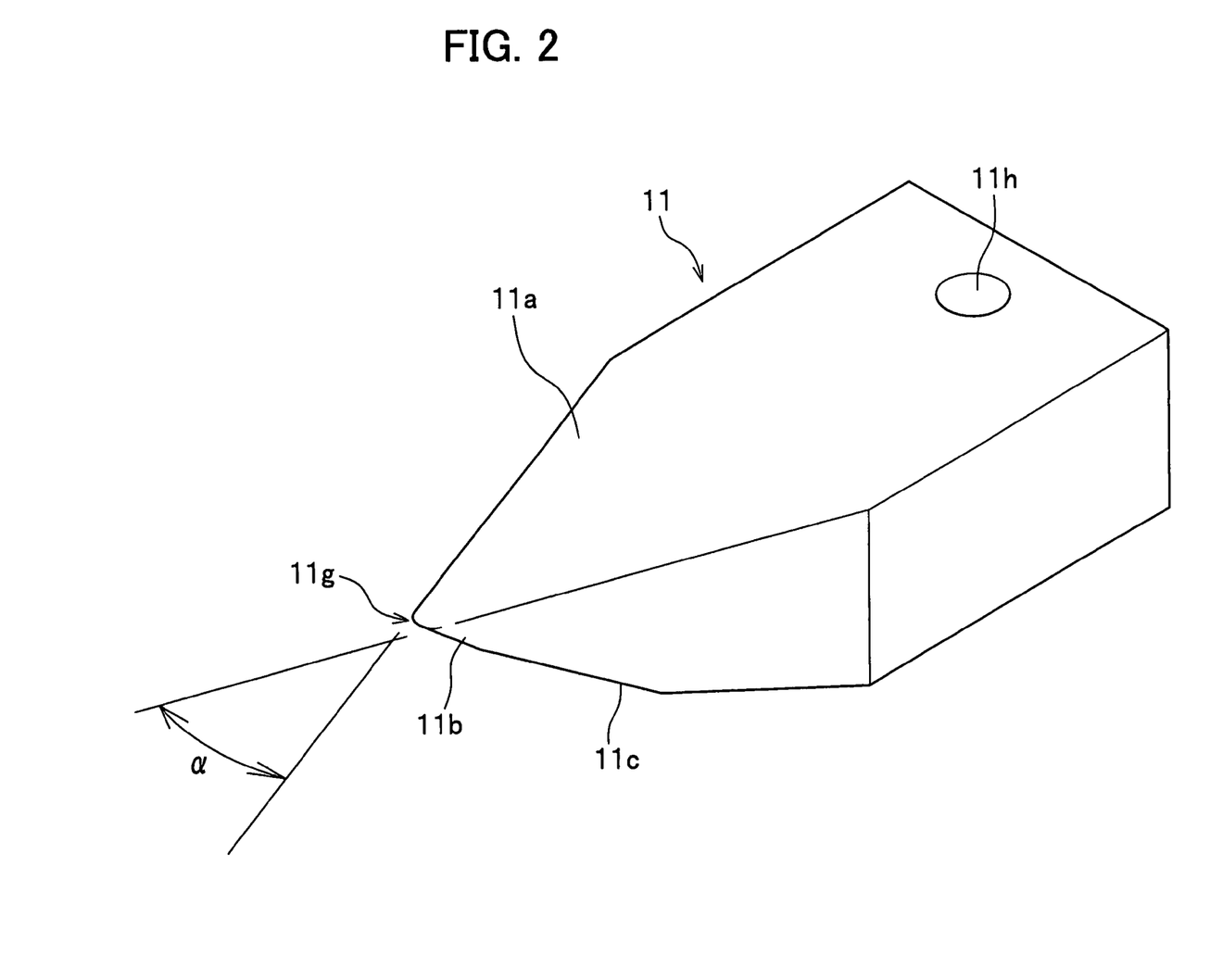
FIG. 2 is an enlarged perspective view of a tip.

As shown in FIG. 2, the tip 11 is formed so as to have a tapered front end portion that is pressed against the workpiece W. A front end shape 11g (so-called "front end R" or "R") of the tip 11 is formed to have an infinitely small radius and a predetermined angle $\alpha$ at a front end thereof.

The tip 11 further includes a rake face 11a on one face thereof, which is mostly used for cutting the workpiece W. At the front end portion of the tip 11, a first flank 11b and a second flank 11c for avoiding interference of the tip 11 with the workpiece W are formed in continuation to the above-mentioned the front end shape 11g.

Also, a bolt hole 11h is formed at a base end portion of the tip 11, so that the tip 11 can be detachably mounted to a tip holding portion 13a (see FIG. 1) of the shank 13 by a bolt (not shown in the drawing). The method of fixing the tip 11 to the shank 13 is not limited to this method by using a bolt, and, for example, a brazing method, etc., may be used instead. The tip 11 is fixed to the shank 13 in such a manner that the rake face 11a thereof faces upward, so that the rake face 11a is fixed substantially orthogonally to the rotation direction of the workpiece W (see FIG. 3A).

As shown in FIG. 1, the shank 13 is an arm in a substantially inverted L shape, and has the tip holding portion 13a for holding the tip 11 at one end thereof. The other end of the shank 13 is detachably fixed to the base (not shown in the drawing).

[Head Portion]

The head portion Sb includes, as main components, a moving stage 31 for shifting the relative positions between the workpiece W and the tip 11 in three directions and a chuck 32 for rotating the workpiece W.

The moving stage 31 includes a front/rear movement, a left/right movement and an up/down movement mechanisms that are not shown in the drawing, whereby the moving stage 31 can be movable in three of front/rear, left/right and up/down directions relative to the tool portion Sa. That is, as shown by the coordinate axes of FIG. 1, the moving stage 31 is allowed to move along a Z-axis of the front/rear direction parallel to a main axis line of the head portion Sb, and along an X-axis of the left/right direction and a Y-axis of the up/down direction that are orthogonal to the Z-axis.

The chuck 32 is the portion onto which the solid cylindrical workpiece W is mounted. The chuck 32 holds the workpiece W by means of, for example, of a vacuum chuck or a plurality of jaws (not shown in the drawing, and also referred to as claw or collets). The chuck 32 is rotatably mounted onto the moving stage 31 so as to rotate at a predetermined speed by a driving motor (not shown in the drawing), etc. Note that the chuck 32 rotates at a normal rotation speed that is relatively high.

Figure 3A:
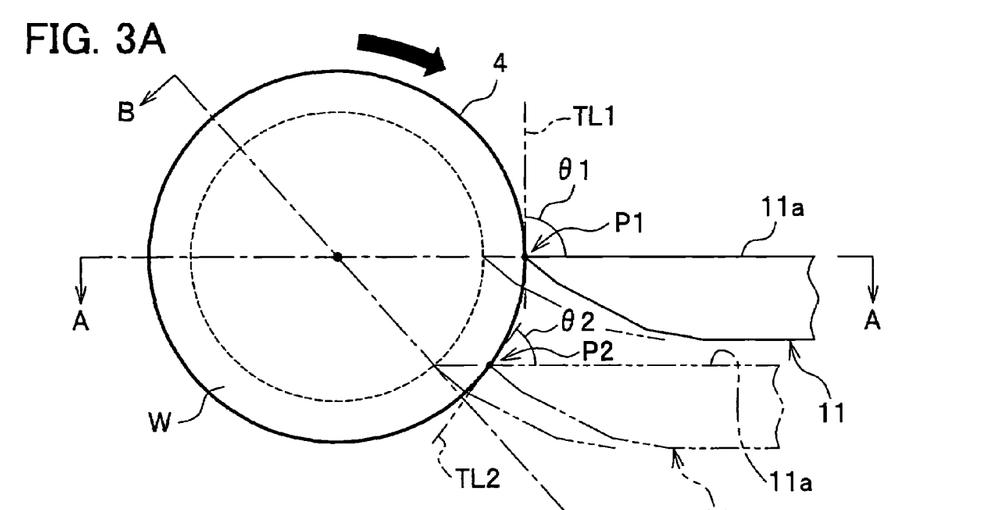
FIG. 3A is a front view of a state in which a workpiece is viewed from an end face.
Figure 3B:
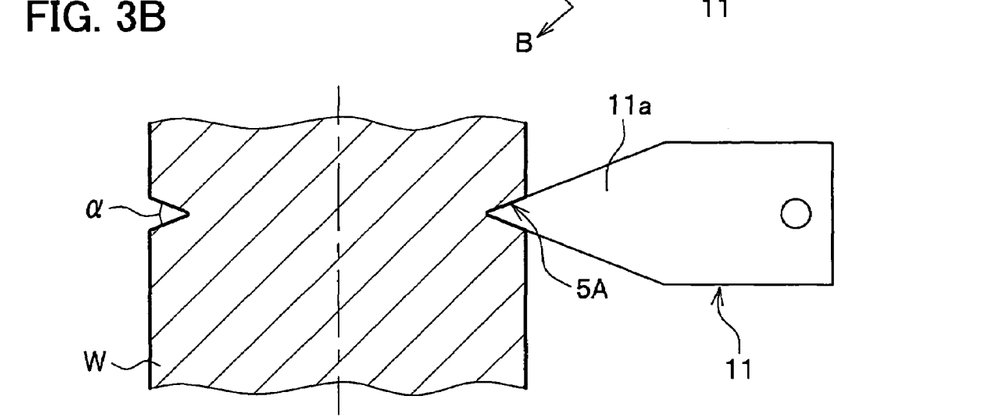
FIG. 3B is a sectional view taken on A-A of FIG. 3A.
Figure 3C:
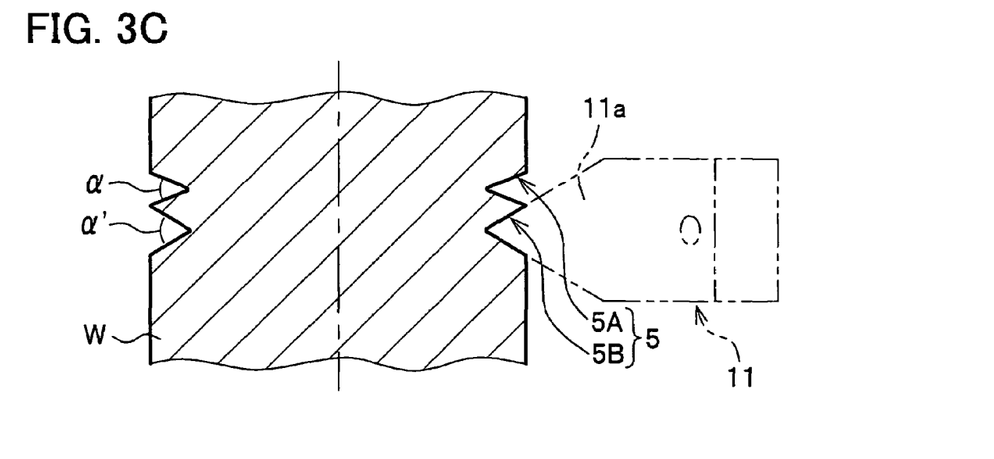
FIG. 3C is a sectional view taken on B-B of FIG. 3A.

The workpiece W is a material used for a molding body having grooves thereon (for example, a roller-shaped mold used in rolling and forming a resin material into a predetermined shape). That is, the workpiece W is worked so as to form a plurality of grooves 5 along a circumferential direction of an outer peripheral face 4 thereof, as shown in FIGS. 3A to 3C. The respective grooves 5 are formed to have different angles thereof, as described below.

A method for manufacturing a molding body having grooves thereon by using the above-described turning device S will be described hereinafter.

As shown in FIG. 1, first, the chuck 32 is driven to rotate the workpiece, and the workpiece W is moved by means of the moving stage 31, so that the front end of the tip 11 is set at a first processing position P1 (to be specific, a position slightly apart from the workpiece W) that is substantially horizontal to the center of the workpiece W, as indicated by the solid line in FIG. 3A.

It can be deemed that the tip 11 moves relative to the workpiece W if the workpiece W is moved by the moving stage 31, as described above. However, only a description will be provided simply on the relative movement of the tip 11 with respect to the workpiece W, omitting a description of the movement of the workpiece W by the moving stage 31 for the sake of convenience.

After the positioning the tip 11 at first processing position P1 as mentioned above, the tip 11 is allowed to prick the outer peripheral face 4 of the workpiece W by a predetermined amount, so that the workpiece W is cut by the side edges of the front end portion of the tip 11 so as to form a groove 5A (groove with the angle α defined by the two slope faces) corresponding to the outer edge shape of the tip 11, as shown in FIG. 3B. Thereafter, the tip 11 is departed from the workpiece W once, and after moving the tip 11 downward (in the direction substantially orthogonal to the rake face 11a) in FIG. 3A and toward this side of FIG. 3A, the tip 11 is moved to a second processing position P2 (to be specific, a position slightly apart from the workpiece W).

Note that angles θ1 and θ2 are defined by the workpiece W and the rake face 11a at the processing positions P1 and P2, respectively, to be specific, by tangents TL1 and TL2 of the workpiece W and the rake face 11a at the positions P1 and P2, respectively, such that θ2 becomes less than θ1. Thus, the tip 11 is inclined in such a manner that the base end portion thereof approaches the workpiece W at the second processing position P2. Accordingly, a groove 5B with an angle α' that is greater than that of the groove 5A formed at the first processing position P1 is formed in a cross section along the radial direction of the workpiece W, as shown in FIG. 3C.

In FIG. 3, the workpiece W and the tip 11 are expressed in different sizes from the actual ones thereof. Both are illustrated in the relationship of the actual sizes thereof in FIGS. 4A and 4B. As shown in FIGS. 4A and 4B, as lower the height position of the tip 11 is shifted every time a groove 5 is processed, an angle of a groove 5 (5A, 5B, . . . ) gradually becomes greater toward a lower position. Here, the height position of the tip 11 is preferably set within the range of a lower half of the workpiece W so that the tip 11 does not interfere with the workpiece W at a corner portion on the back side (see FIG. 2) of the rake face 11a thereof.

The angle of the groove 5 is easily determined by using the following equation:

$$\tan\left(\frac{\beta}{2}\right) = \frac{\sqrt{R^2 - Y^2} - \sqrt{(R-D)^2 - Y^2}}{D} \times \tan\left(\frac{\alpha}{2}\right)$$

where β is an angle of the groove, R is a radius of the workpiece, Y is a tip height (moving distance of the tip in the direction orthogonal to the rotation axis and parallel to the plane), D is a depth of the groove, α is an angle of the front end of the tip.

The angle β of the groove 5 can be easily determined according to the angle α of the tip 11, by using the above equation.

As described above, the present embodiment provides the following effects:

The slope faces of each groove 5 can be formed by the outer edges of the front end of the tip 11, so that slope faces of the groove 5 can be formed to have good surface roughness.

Simply by changing the height position of the tip 11 without changing the angle of the tip 11, the angle of the slope faces of the groove 5 can be changed easily.

The present invention is not limited to the above-described embodiment and can be put into practice in various modes.

In the above-described embodiment, although the moving stage 31 movable in three axial directions is disposed on the head portion Sb side, the present invention is not limited thereto. For example, other structures can be employed, in which the head portion Sb side is fixed, and a moving stage movable in three axial directions (front/rear, left/right and up/down) is disposed on the tool portion Sa side, the head portion Sb side is also fixed and the moving stage movable in one axial direction (for example, front/rear alone) is disposed at the head portion Sb side, or a moving stage movable in two axial directions (for example, left/right and up/down) is disposed at the tool portion Sa side, etc.

Figure 5:
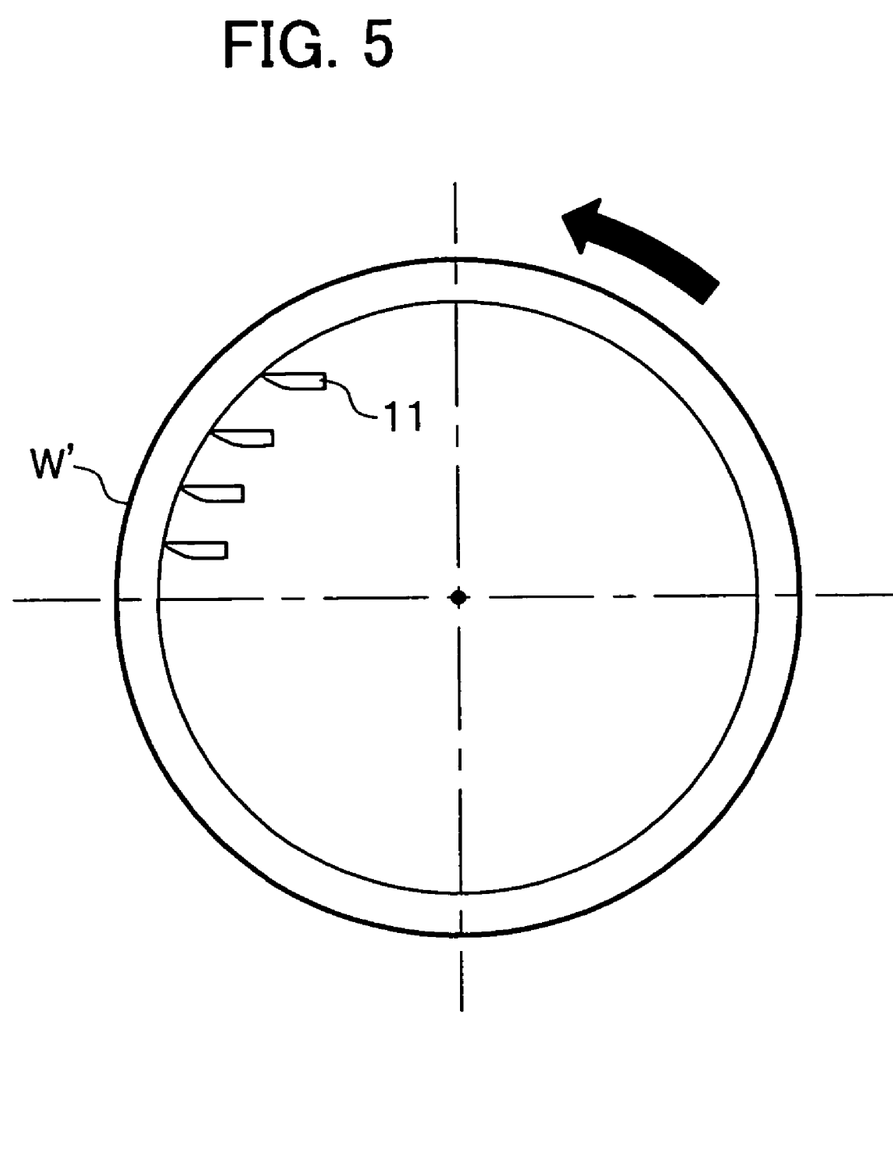
FIG. 5 is a front view illustrating a method for forming grooves having different angles on an inner peripheral face of a hollow cylindrical workpiece.

In the present embodiment, the plurality of the grooves 5 with different angles are formed along the outer peripheral face of the workpiece W. However, a plurality of grooves with different angles may also be formed on an inner peripheral face of a hollow cylindrical workpiece W' by shifting the height position of the tip 11 with the front end thereof in contact with the inner peripheral face of the workpiece W', as shown in FIG. 5. In this case, the height position of the tip 11 is preferably set within the range of an upper half of the workpiece W' so that the tip 11 does not interfere with the workpiece W at a corner portion on the back side (see FIG. 2) of the rake face 11a thereof.

In the above-described embodiment, although the plurality of the grooves 5 with different angles are formed in the single workpiece W, the present invention is not limited thereto. The present invention can be applied to a case where a single groove with a predetermined angle is formed on a single workpiece, and then another groove with a different angle can be formed on a different workpiece, by exchanging the workpiece one after another.

Figure 6A:
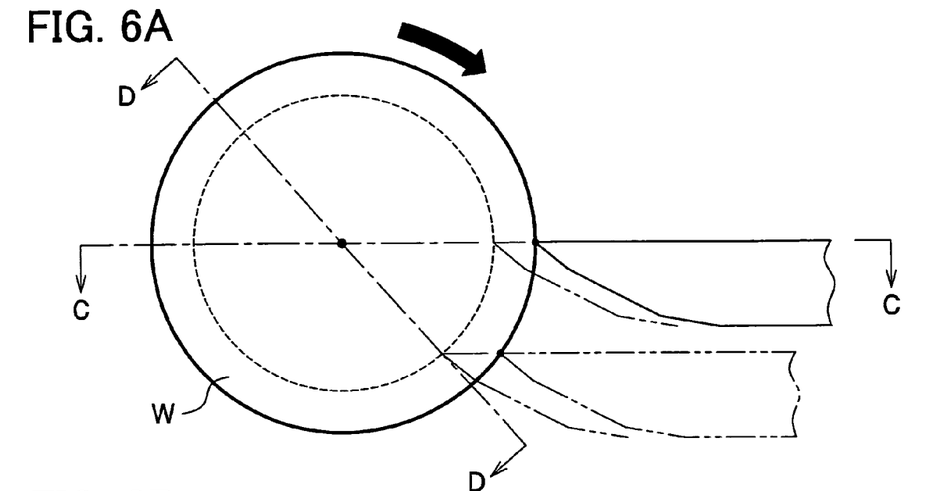
FIG. 6A is a front view of a state in which a workpiece is viewed from an end face.
Figure 6B:
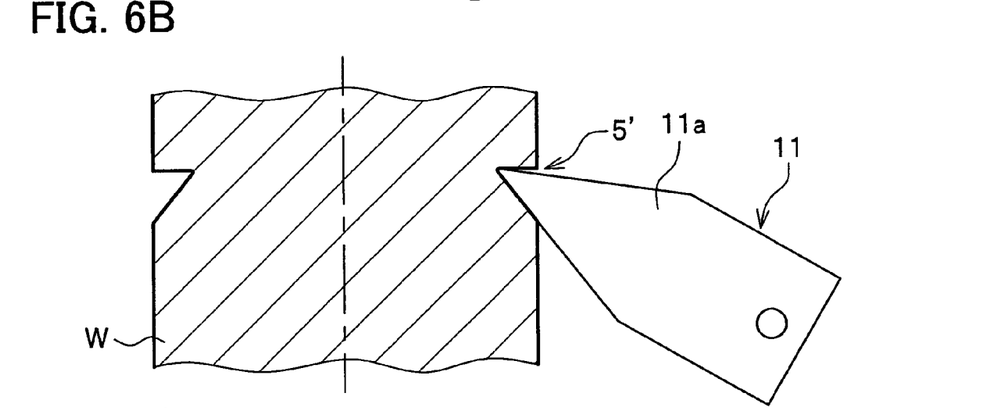
FIG. 6B is a sectional view taken on C-C of FIG. 6A.
Figure 6C:
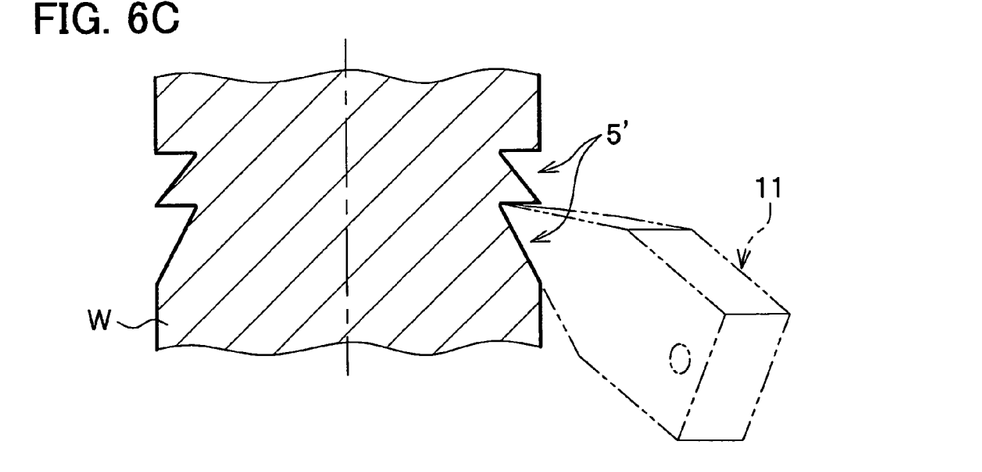
FIG. 6C is a sectional view taken on D-D of FIG. 6A.

In the above-described embodiment, although the groove 5 is formed using both side edges of the tip 11, the present invention is not limited thereto. If the rake face 11a of the tip 11 is horizontally tilted relative to the rotation axis so that a groove 5' can be formed by using only one of the side edges of the tip 11, as shown in FIG. 6B. According to this method, one face defining the groove 5' is formed to become orthogonal relative to the axis of the workpiece W and the other face defining the groove 5' is formed to become inclined relative to the axis, the angle of the inclined face relative to the axis of the workpiece W can be changed simply by changing the height position of the tip 11, as shown in FIGS. 6A and 6C.

In the above-described embodiment, although the molding body having grooves thereon is descried as a roller-like mold with grooves on an outer peripheral face thereof, the present invention is not limited thereto. The molding body having grooves thereon may be an inserted plate-like mold with grooves thereon for forming a prism sheet, or may be a mold for forming a cylindrical lens with grooves thereon. The present invention can be applicable to any other formed bodies as long as grooves are formed on the outer peripheral face or the inner peripheral face thereof during processing operation.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A method of manufacturing a molding body having at least one groove thereon, the method being performed by the following steps of:
    A: rotating a workpiece having a curved face with a predetermined curvature;
    B: forming a first groove; and
    C: changing a relative position between the tip and the workpiece,
    in the step of A, the workpiece being rotated about a rotation axis which agrees with a center of the curvature of the curved face thereof;
    in the step B, the first groove being formed in such a manner that, while an angle of the rake face of the tip relative to a plane including the rotation axis is fixed in a direction orthogonal to the plane, the workpiece and the tip are converged and the tip is engaged with the curved face of the rotating workpiece so as to form on the curved face the first groove defined by the outer edge shape of the tip, and engagement orientation and depth of the rake face relative to the curved face of the workpiece; and
    in the step C, the relative position between the tip and the workpiece being changed by translating the position of the tip in the direction orthogonal to the rotation axis and parallel to the plane.

2. The method according to claim 1, wherein, in the step C, the relative position between the tip and the workpiece is changed, prior to forming the first groove, by translating the position of the tip in the direction orthogonal to the rotation axis and parallel to the plane at a predetermined distance from a reference position.

3. The method according to claim 1, wherein, in the step C, the relative position between the tip and the workpiece is changed, prior to forming the first groove, by translating the position of the workpiece so as to shift the rotation axis of the workpiece in the direction parallel to the plane at a predetermined distance from a reference position.

4. The method according to claim 1, wherein
    in the step C, the relative position between the tip and the workpiece is further changed, following forming the first groove, by translating the position of the tip in the direction parallel to the rotation axis of the workpiece, and
    in the B step, a second groove is formed in such a manner that, while the angle of the rake face of the tip relative to the plane including the rotation axis is fixed in the orthogonal direction to the plane, the workpiece and the tip are allowed to approach each other, and then the tip is engaged with the curved face of the rotating workpiece so as to form on the curved face a second groove defined by the outer edge shape of the tip, and the direction and depth of the engagement of the tip with the curved face of the workpiece.

5. The method according to claim 4, wherein, in the C step, the position of the tip is translated relative to the workpiece.

6. The method according to claim 4, wherein, in the C step, the rotation axis of the workpiece is translated relative to the plane.

7. The method according to claim 1, wherein the workpiece has one shape selected form the group comprising a solid cylinder shape, a hollow cylinder shape, a predetermined cavity shape of hollow cylinder having a bottom, torus, and sheet wound around a cylindrical jig.

8. The method according to claim 1, wherein the tip is fixed in respect to the outer edge shape and the direction of the rake face thereof relative to the rotation axis.

9. The method according to claim 1, wherein the first groove has a different angle from that of the outer edge shape of the tip.

10. The method according to claim 1 wherein the second groove has a different angle from that of the outer edge shape of the tip.

11. The method according to claim 1, further being performed by the following steps of:
    A: stopping rotation of the workpiece and replacing the workpiece with a second workpiece having a curved face with a predetermined curvature;
    B: rotating the second workpiece about a rotation axis which agrees with a center of the curvature of the curved face thereof;
    C: forming a first groove; and wherein
    in the step B, a third groove is formed, following shifting the relative position between the tip and the workpiece, in such the manner that, while the angle of the rake face of the tip relative to the plane including the rotation axis is fixed in the orthogonal direction to the plane, the second workpiece and the tip are allowed to approach each other, and then the tip is engaged with the second curved face of the second rotating workpiece so as to form on the second curved face of a third groove defined by the outer edge shape of the tip, and a direction and depth of the engagement of the tip with the second curved face of the workpiece.

12. The method according to claim 11, wherein the third groove has a different angle from that of the outer edge shape of the tip.

13. The method according to claim 11, wherein the third groove has a different angle from that of the first groove.

14. The method according to claim 8, wherein the outer edge shape of the tip has a sharply pointed shape at a front end thereof, and at least either side edge is fixed in a predetermined direction within the face of the rake face so that the side edge of the tip is engaged with the curved face of the workpiece to form a groove in a predetermined shape.

15. The method according to claim 1, wherein a desired angle of the groove is obtained by setting parameters in an equation below:

$$\tan\left(\frac{\beta}{2}\right) = \frac{\sqrt{R^2 - Y^2} - \sqrt{(R-D)^2 - Y^2}}{D} \times \tan\left(\frac{\alpha}{2}\right)$$

where β is an angle of the groove, R is a radius of the workpiece, Y is a tip height (moving distance of the tip in the direction orthogonal to the rotation axis and parallel to the plane), D is a depth of the groove, α is an angle of the front end of the tip.

* * * * *